United States Patent
Fu et al.

(10) Patent No.: US 9,594,974 B2
(45) Date of Patent: Mar. 14, 2017

(54) DEPTH IMAGE FILTERING METHOD, AND DEPTH IMAGE FILTERING THRESHOLD OBTAINING METHOD AND APPARATUS

(71) Applicant: Huawei Technologies Co., Ltd., Shenzhen (CN)

(72) Inventors: Jiali Fu, Shenzhen (CN); Fabian Jaeger, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 256 days.

(21) Appl. No.: 14/285,955

(22) Filed: May 23, 2014

(65) Prior Publication Data
US 2014/0254937 A1   Sep. 11, 2014

Related U.S. Application Data

(63) Continuation of application No. PCT/CN2012/084890, filed on Nov. 20, 2012.

(30) Foreign Application Priority Data

Nov. 23, 2011   (CN) .......................... 2011 1 0376446

(51) Int. Cl.
*H04N 13/00*  (2006.01)
*G06T 5/20*  (2006.01)
(Continued)

(52) U.S. Cl.
CPC ................. *G06K 9/46* (2013.01); *G06T 5/00* (2013.01); *G06T 5/002* (2013.01); *G06T 5/20* (2013.01);
(Continued)

(58) Field of Classification Search
CPC .. G06K 9/46; H04N 13/0022; H04N 13/0048; H04N 19/597; H04N 19/80; G06T 5/002; G06T 5/20
See application file for complete search history.

(56) References Cited

U.S. PATENT DOCUMENTS 7,945,111 B2    5/2011   Ishiga
2007/0286519 A1  12/2007  Friedrich
(Continued)

FOREIGN PATENT DOCUMENTS

| CN | 1867075 A | 11/2006 |
| CN | 101312539 A | 11/2008 |

(Continued)

OTHER PUBLICATIONS

Foreign Communication From a Counterpart Application, Chinese Application No. 201110376446.0, Chinese Office Action dated Sep. 11, 2014, 10 pages.
(Continued)

*Primary Examiner* — Siamak Harandi
(74) *Attorney, Agent, or Firm* — Conley Rose, P.C.

(57) ABSTRACT

A depth image filtering method, and a filtering threshold obtaining method and apparatus are provided. The method in the embodiments of the present invention includes: determining, for each pixel in an adjacent area of a pixel of a to-be-filtered depth image, whether the pixel meets a preset condition; determining a set of pixels meeting the preset condition; and determining a pixel value of the pixel of the to-be-filtered depth image according to pixel values of the pixels in the set. According to the embodiments of the present invention, a ringing effect at an edge of a depth image is effectively removed, and discontinuity of the depth image is reduced, thereby improving quality of a video image.

16 Claims, 16 Drawing Sheets

(51) Int. Cl.
*G06K 9/46* (2006.01)
*G06T 5/00* (2006.01)
*H04N 19/597* (2014.01)
*H04N 19/80* (2014.01)

(52) U.S. Cl.
CPC ....... *H04N 13/0022* (2013.01); *H04N 19/597* (2014.11); *H04N 19/80* (2014.11); *G06K 2009/4666* (2013.01); *G06T 2207/10028* (2013.01); *H04N 13/0048* (2013.01)

(56) References Cited

U.S. PATENT DOCUMENTS

| | | | |
|---|---|---|---|
| 2009/0148062 A1* | 6/2009 | Gabso | G06T 7/0085 382/266 |
| 2010/0034480 A1 | 2/2010 | Rao | |
| 2011/0026591 A1* | 2/2011 | Bauza | G06T 1/00 375/240.12 |
| 2011/0128282 A1 | 6/2011 | Wang et al. | |
| 2014/0168206 A1 | 6/2014 | Barenbrug | |

FOREIGN PATENT DOCUMENTS

| | | |
|---|---|---|
| CN | 101322418 A | 12/2008 |
| CN | 101645168 A | 2/2010 |
| CN | 102202224 A | 9/2011 |

OTHER PUBLICATIONS

Foreign Communication From a Counterpart Application, Chinese Application No. 201110376446.0, Chinese Search Report dated Aug. 29, 2014, 2 pages.
Longxiang, S., "Chapter 2 Early Processing of Depth Image," Sep. 30, 1996, pp. 23-32.
English Translation of Longxiang, S., "Chapter 2 Early Processing of Depth Image," Sep. 30, 1996, pp. 23-32.
Jixiang, S., "Digital Image Processing," Jun. 30, 1993, pp. 137-146.
English Translation of Jixiang, S., "Digital Image Processing," Jun. 30, 1993, pp. 137-146.
Partial English Translation and Abstract of Chinese Patent Application No. CN1867075A, Jun. 24, 2014, 48 pages.
Partial English Translation and Abstract of Chinese Patent Application No. CN102202224A, Part 1, Jun. 24, 2014, 40 pages.
Partial English Translation and Abstract of Chinese Patent Application No. CN102202224A, Part 2, Jun. 24, 2014, 8 pages.
Foreign Communication From a Counterpart Application, PCT Application No. PCT/CN2012/084890, International Search Report dated Jan. 24, 2013, 8 pages.
Foreign Communication From a Counterpart Application, PCT Application No. PCT/CN2012/084890, Written Opinion dated Jan. 24, 2013, 7 pages.

* cited by examiner

DEPTH IMAGE FILTERING METHOD, AND DEPTH IMAGE FILTERING THRESHOLD OBTAINING METHOD AND APPARATUS

CROSS-REFERENCE TO RELATED APPLICATIONS

This application is a continuation of International Application No. PCT/CN2012/084890, filed on Nov. 20, 2012, which claims priority to Chinese Patent Application No. 201110376446.0, filed on Nov. 23, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

Embodiments of the present invention relate to the field of video encoding and decoding technologies, and in particular, to a depth image filtering method and a depth image filtering threshold obtaining method and apparatus.

BACKGROUND

With the development of multimedia communications technologies, people desire three-dimensional (3D) videos in many application fields, such as entertainment and education. The foregoing applications all require that a plurality of camcorders is used for simultaneously obtaining video signals of a same scenario from different angles at different spatial locations, and effectively compressing, encoding, and transmitting a set of obtained video signals.

A depth image is introduced into a 3D video encoding and decoding technology, and different from a video image, the depth image is generally not used for displaying, but is used for generation of a virtual video. A depth image reconstructed after decoding needs to be filtered, so as to remove a blocking artifact.

In the prior art, a bilateral filter is used to filter a depth image. The bilateral filter is put forward based on a Gauss filtering method, where mainly for a principle, in Gauss filtering, that a weight value of Gauss is directly convoluted with an image pixel value to perform image filtering, a filtering weight coefficient is optimized to obtain a product of a Gauss function and image luminance information, and then the optimized weight coefficient is convoluted with the image pixel value, which may be used for keeping a sharp edge, but other parts of the image are smooth, causing the image to be vague.

SUMMARY

Embodiments of the present invention provide a depth image filtering method, a depth image filtering threshold obtaining method and apparatus, which may effectively remove a ringing effect at an edge of a depth image, and reduce discontinuity of the depth image, thereby improving the quality of a video image.

An embodiment of the present invention provides a depth image filtering method, including: determining, for each pixel in an adjacent area of a pixel of a to-be-filtered depth image, whether the pixel meets a preset condition; determining a set of pixels meeting the preset condition; and determining a pixel value of the pixel of the to-be-filtered depth image according to pixel values of the pixels in the set.

An embodiment of the present invention further provides a depth image filtering threshold obtaining method, including: receiving data from a video encoding end; and obtaining a depth image filtering threshold from the data that is received from the video encoding end, where the depth image filtering threshold is used for setting a preset condition so as to determine a set of pixels which are in an adjacent area of a pixel of a to-be-filtered depth image and meet the preset condition, and pixel values of the pixels in the set are used for determining a pixel value of the pixel of the to-be-filtered depth image.

An embodiment of the present invention further provides a depth image filtering apparatus, including: a first judging unit configured to: determine, for each pixel in an adjacent area of a pixel of a to-be-filtered depth image, whether the pixel meets a preset condition; a first determining unit configured to determine a set of pixels meeting the preset condition; and a first pixel value determining unit configured to determine a pixel value of the pixel of the to-be-filtered depth image according to pixel values of the pixels in the set.

An embodiment of the present invention further provides a video decoding end, including: a receiving unit configured to receive data from a video encoding end; and a filtering threshold obtaining unit configured to obtain a depth image filtering threshold from the data that is received from the video encoding end, where the depth image filtering coefficient is used for setting a preset condition so as to determine a set of pixels which are in an adjacent area of a pixel of a to-be-filtered depth image and meet the preset condition, and pixel values of the pixels in the set are used for determining a pixel value of the pixel of the to-be-filtered depth image.

According to the embodiments of the present invention, for each pixel in an adjacent area of a pixel of a to-be-filtered depth image, whether the pixel meets a preset condition is determined, a set of pixels meeting the preset condition is determined, and a pixel value of the pixel of the to-be-filtered depth image is determined according to pixel values of the pixels in the set, which may effectively remove a ringing effect at an edge of a depth image, and reduce discontinuity of the depth image, thereby improving the quality of a video image.

BRIEF DESCRIPTION OF THE DRAWINGS

To describe the technical solutions according to the embodiments of the present invention more clearly, the accompanying drawings for describing the embodiments are introduced briefly in the following. The accompanying drawings in the following description are only some embodiments of the present invention, and persons of ordinary skill in the art can derive other drawings from the accompanying drawings without creative efforts.

DETAILED DESCRIPTION

To make the objectives, technical solutions, and advantages of the embodiments of the present invention more clear, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
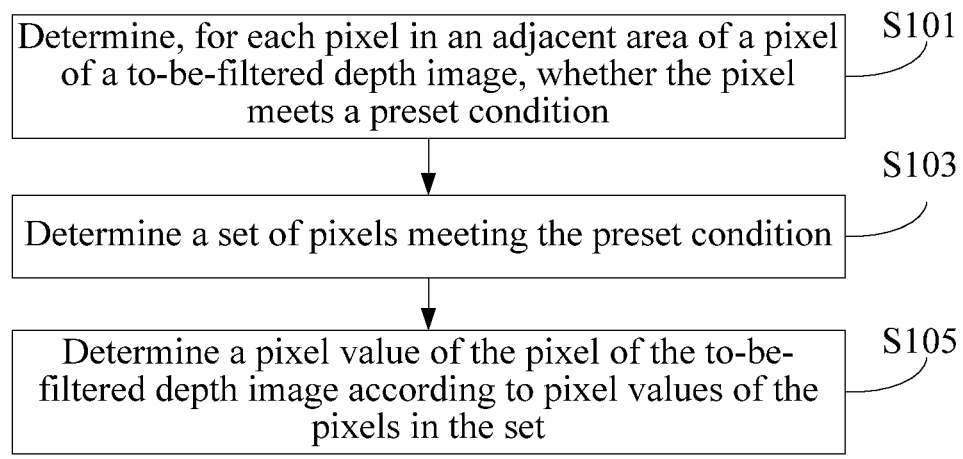
FIG. 1 is a flowchart of a depth image filtering method according to Embodiment 1 of the present invention.

FIG. 1 is a flowchart of a depth image filtering method according to Embodiment 1 of the present invention, and the method includes:

Step S101: Determine, for each pixel in an adjacent area of a pixel of a to-be-filtered depth image, whether the pixel meets a preset condition.

Step S103: Determine a set of pixels meeting the preset condition.

Step S105: Determine a pixel value of the pixel of the to-be-filtered depth image according to pixel values of the pixels in the set.

Step S105 may specifically include:

Step S105': Determine a median of the pixel values of the pixels in the set, and use the median as the pixel value of the pixel of the to-be-filtered depth image.

The "median" mentioned in the embodiment of the present invention may be a value of an element arranged or an average value of elements arranged in the middle of the set, or may be an average value of elements in the set with a maximum value and a minimum value removed. The median may be calculated in multiple forms.

Figure 2:
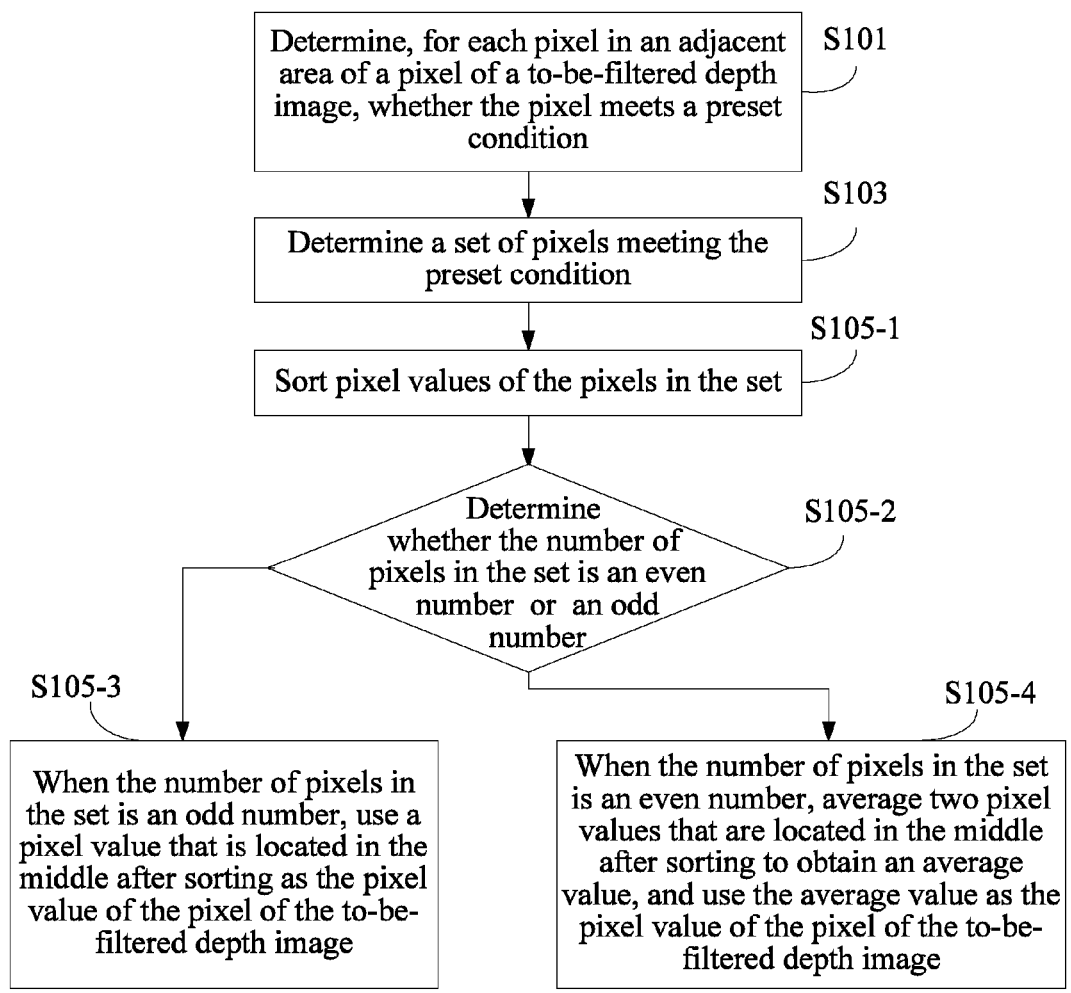
FIG. 2 is a flowchart of another depth image filtering method according to Embodiment 1 of the present invention.

Optionally, a first filtering algorithm may be used, and a complete procedure is shown in FIG. 2, that is, step S105' may specifically include:

Step S105-1: Sort the pixel values of the pixels in the set.

Step S105-2: Determine whether the number of pixels in the set is an even number or an odd number.

Step S105-3: When the number of pixels in the set is an odd number, use a pixel value that is located in the middle after sorting as the pixel value of the pixel of the to-be-filtered depth image.

Step S105-4: When the number of pixels in the set is an even number, average two pixel values that are located in the middle after sorting to obtain an average value, and use the average value as the pixel value of the pixel of the to-be-filtered depth image.

Figure 3:
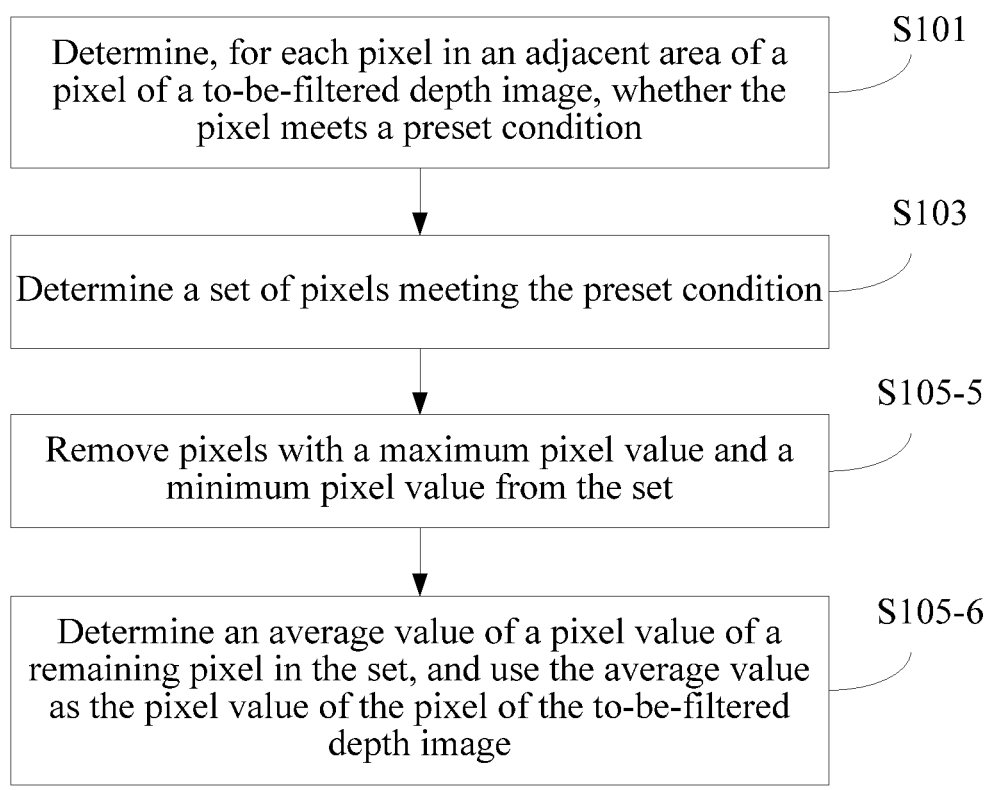
FIG. 3 is a flowchart of another depth image filtering method according to Embodiment 1 of the present invention.

Optionally, a second filtering algorithm may be used, and a complete procedure is shown in FIG. 3, that is, step S105' may specifically include:

Step S105-5: Remove pixels with a maximum pixel value and a minimum pixel value from the set.

Step S105-6: Determine an average value of pixel values of remaining pixels in the set, and use the average value as the pixel value of the pixel of the to-be-filtered depth image.

Figure 4:
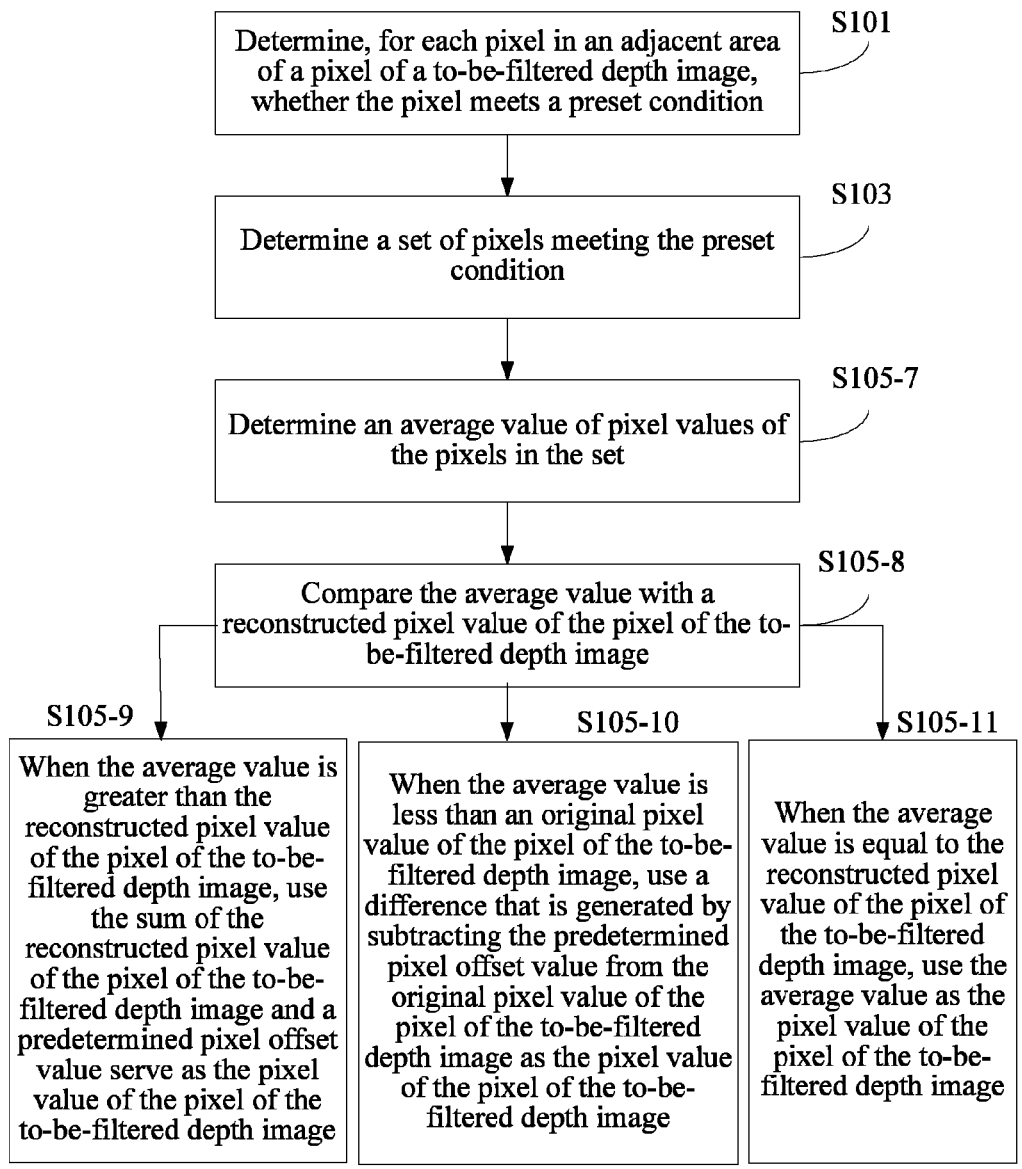
FIG. 4 is a flowchart of another depth image filtering method according to Embodiment 1 of the present invention.

Optionally, a third filtering algorithm may be used, and a complete procedure is shown in FIG. 4, that is, step S105' may specifically include:

Step S105-7: Determine an average value of the pixel values of the pixels in the set.

Step S105-8: Compare the average value with a reconstructed pixel value of the pixel of the to-be-filtered depth image.

Step S105-9: When the average value is greater than an original pixel value of the pixel of the to-be-filtered depth image, use the sum of the reconstructed pixel value of the pixel of the to-be-filtered depth image and a pixel offset value as the pixel value of the pixel of the to-be-filtered depth image.

Step S105-10: When the average value is less than an original pixel value of the pixel of the to-be-filtered depth image, use a difference that is generated by subtracting the pixel offset value from the reconstructed pixel value of the pixel of the to-be-filtered depth image as the pixel value of the pixel of the to-be-filtered depth image.

Step S105-11: When the average value is equal to an original pixel value of the pixel of the to-be-filtered depth image, use the average value as the pixel value of the pixel of the to-be-filtered depth image.

Optionally, before step S101, the method may further include a step of determining the adjacent area of the pixel of the to-be-filtered depth image, where the adjacent area may be in any shape, such as a row, or a column, or a rectangle, or a square.

The foregoing preset condition may include at least one of the following conditions:

a. a spatial distance between the pixel of the to-be-filtered depth image and the pixel in the adjacent area is less than or equal to a first filtering threshold;

b. a difference value between a depth image pixel value of the pixel of the to-be-filtered depth image and a depth image pixel value of the pixel in the adjacent area is less than or equal to a second filtering threshold; and c. a difference value between a video image pixel value corresponding to a location of the pixel of the to-be-filtered depth image and a video image pixel value of the pixel in the adjacent area is less than or equal to a third filtering threshold.

The foregoing preset condition may be that one condition among a, b, and c is satisfied, or both a and b are satisfied, or both a and c are satisfied, or both b and c are satisfied, or a, b, and c are all satisfied. The difference value of the pixel value may be calculated based on each individual component of an image in any image format, for example, in a luminance and chrominance (YUV) format, may be a difference value of each component (Y or U or V) value, or may be calculated based on an average value of any two component values. An image format may be a format, such as YUV and red green blue (RGB).

Specifically, the first filtering threshold may be marked as $\sigma_l$, the second filtering threshold may be marked as $\sigma_r$, and the third filtering threshold may be marked as $\sigma_d$. The pixel of the to-be-filtered depth image of a reconstructed depth image is marked as p, and an adjacent area of p is taken and is a 5×5 image block; therefore, there are 5×5=25 adjacent pixels in the adjacent area in total, and each pixel is marked as $q_i$ (i=1, 2, . . . 25). For each pixel $q_i$, difference values between each pixel $q_i$ and the pixel p of the to-be-filtered depth image respectively in three dimensions, which are a space domain, a depth image domain, and a video image domain, are calculated, that is:

a spatial geometrical distance l: $|p-q_i|$, a difference value d of depth image pixel values: $|D(p)-D(q_i)|$, and a difference value r of video image pixel values: $|Y(p)-Y(q_i)|$.

Specifically, it is supposed that coordinates of the p are (M, N), and coordinates of the $q_i$ are $(m_i, n_i)$, and the $|p-q_i|$ may be calculated in the following manner:

$$|p-d_i| = \sqrt{(M-m_i)^2 + (N-n_i)^2}.$$

The l, r, and d may be respectively compared with the first filtering threshold $\sigma_l$, the second filtering threshold $\sigma_r$, and the third filtering threshold $\sigma_d$. The foregoing conditions a, b, and c may be respectively indicated as:

$|p-q_i| \leq \sigma_l$, $|D(p)-D(q_i)| \leq \sigma_r$, and $|Y(p)-Y(q_i)| \leq \sigma_d$.

Specifically, when the first filtering algorithm is used, after all the pixels $q_i$ (i=1, 2, . . . 25) are traversed, the set of pixels meeting the preset condition is determined; and the pixel values of the pixels in the set are sorted. The number of pixels in the set may be an odd number, or may also be an even number. When the number of pixels in the set is an odd number, the pixel value located in the middle after sorting is used as the pixel value of the pixel of the to-be-filtered depth image; and when the number of pixels in the set is an even number, the two pixel values that are located in the middle after sorting are averaged to obtain an average value, and the average value is used as the pixel value of the pixel of the to-be-filtered depth image.

In the embodiment of the present invention, the "average value" refers to a positive integer closest to an average value obtained by actual calculation. In specific calculation, the sum generated by adding 0.5 to the average value obtained by the actual calculation may be rounded down. That is, the average value is $$A' = \lfloor A + 0.5 \rfloor = \left\lfloor \left(\sum_{i=1}^{n} q_i\right) / n + 0.5 \right\rfloor,$$

where, the $\lfloor \ \rfloor$ is a rounding down operation.

For example, a set of pixels meeting the preset condition includes $q_1$, $q_5$, $q_{12}$, $q_{18}$, $q_{21}$ (pixel values are respectively 11, 25, 2, 8, 33), the pixel values of the $q_1$, $q_5$, $q_{12}$, $q_{18}$, $q_{21}$ are sorted, and the pixel value arranged in the middle is 11, so that 11 is used as a pixel value of a pixel of a to-be-filtered depth image.

For example, a set of pixels meeting the preset condition includes $q_1$, $q_5$, $q_{12}$, $q_{18}$, $q_{21}$, $q_{23}$ (pixel values are respectively 11, 25, 2, 8, 33, 6), the pixel values of the $q_1$, $q_5$, $q_{12}$, $q_{18}$, $q_{21}$, $q_{23}$ are sorted, and pixel values arranged in the middle are 8 and 11, so that a mathematical average value $\lfloor 9.5 + 0.5 \rfloor = 10$ of the 8 and 11 is used as the pixel value of the pixel of the to-be-filtered depth image. Herein, the mathematical average value is used as an example. Definitely, an average value in another form may also be used, such as a geometrical average value.

Specifically, when the second filtering algorithm is used, after all the pixels $q_i$ (i=1, 2, . . . , 25) are traversed, the set of pixels meeting the preset condition is determined; the pixels with the maximum pixel value and the minimum pixel value are removed from the set, remaining pixels in the set are averaged to obtain an average value, and the positive integer closest to the average value is used as the pixel value of the pixel of the to-be-filtered depth image.

For example, a set of pixels meeting the preset condition includes $q_1$, $q_5$, $q_{12}$, $q_{18}$, $q_{21}$ (pixel values are respectively 11, 25, 2, 8, 33), pixels $q_{21}$ and $q_{12}$, of the maximum and minimum pixel values of the $q_1$, $q_5$, $q_{12}$, $q_{18}$, $q_{21}$ are removed, and the rest $q_1$, $q_5$, $q_{18}$ are averaged to obtain an average value $\lfloor (11+25+8)/3 + 0.5 \rfloor = 15$; the average value 15 is used as the pixel value of the pixel of the to-be-filtered depth image.

Specifically, when the third filtering algorithm is used, after all the pixels $q_i$ (i=1, 2, . . . 25) are traversed, the set of pixels meeting the preset condition is determined; the pixel values of the pixels in the set are averaged to obtain an average value, and the average value and the reconstructed pixel value of a current to-be-filtered pixel are compared: when the reconstructed pixel value is greater than or less than the average value, the pixel offset value is subtracted from or added to the reconstructed pixel value to serve as the pixel value of the pixel of the to-be-filtered depth image; and when the reconstructed pixel value is equal to the average value, the average value is directly used as the pixel value of the pixel of the to-be-filtered depth image.

The pixel offset value may be a positive integer closest to a quotient generated by dividing the average value by the number of pixels in the set, or may also be obtained by using another method.

Assuming that a set of pixels meeting the preset condition includes $q_1$, $q_5$, $q_{12}$, $q_{18}$, $q_{21}$ (pixel values are respectively 11, 25, 2, 8, 33), the pixel offset value is $\lfloor 16/5 + 0.5 \rfloor = 3$.

For example, a reconstructed pixel value of a current reconstructed pixel is 15, pixel values of the $q_1$, $q_5$, $q_{12}$, $q_{18}$, $q_{21}$ are averaged to obtain an average value $\lfloor (11+25+2+8+33)/5 + 0.5 \rfloor = 16$, and the reconstructed pixel value and the average value 16 are compared. Because the reconstructed pixel value 15 is less than the average value 16, the reconstructed pixel value is added to the pixel offset value to obtain the pixel value of the pixel of the to-be-filtered depth image, that is, a pixel value finally filtered is 15+3=18.

For example, a reconstructed pixel value of a current reconstructed pixel is 18, pixel values of the $q_1$, $q_5$, $q_{12}$, $q_{18}$, $q_{21}$ are averaged to obtain an average value $\lfloor(11+25+2+8+33)/5+0.5\rfloor=16$, and the reconstructed pixel value and the average value are compared. Because the reconstructed pixel value 18 is greater than the average value 16, the pixel offset value is subtracted from the reconstructed pixel value to obtain the pixel value of the pixel of the to-be-filtered depth image, that is, a pixel value finally filtered is 18−3=15.

For example, a reconstructed pixel value of a current pixel is 16, pixel values of the $q_1$, $q_5$, $q_{12}$, $q_{18}$, $q_{21}$ are averaged to obtain an average value $(11+25+2+8+33)/5+0.5=16$, and the reconstructed pixel value and the average value are compared. Because the reconstructed pixel value 16 is equal to the average value 16, the average value is used as the pixel value of the pixel of the to-be-filtered depth image.

The method according to the embodiment of the present invention may be executed by a processor (such as a central processing unit (CPU)) or an application-specific integrated circuit (ASIC), or the like. The method according to the embodiment of the present invention may be implemented at a video encoding end or decoding end.

According to the embodiment of the present invention, for each pixel in an adjacent area of a pixel of a to-be-filtered depth image, whether the pixel meets a preset condition is determined; a set of pixels meeting the preset condition is determined; and a pixel value of the pixel of the to-be-filtered depth image is determined according to pixel values of the pixels in the set, which may effectively remove a ringing effect at an edge of a depth image, and reduce discontinuity of the depth image, thereby improving the quality of a video image.

Embodiment 2

The embodiment of the present invention introduces in detail how to obtain a first filtering threshold $\sigma_l$, a second filtering threshold $\sigma_r$, and a third filtering threshold $\sigma_d$, where: the first filtering threshold $\sigma_l$ may be an empirical value 4; the second filtering threshold $\sigma_r$ may be obtained by solving a video image filter coefficient which makes an error between an original video image and a reconstructed video image minimum; and the error herein may be a mean squared error (MSE) or an error in another type; and the third filtering threshold $\sigma_d$ may be obtained by solving a depth image filter coefficient which makes an error between an original depth image and a reconstructed depth image minimum; and the error herein may be a mean squared error or an error in another type.

Specifically, solving $\sigma_r$ is used as an example: use $Z_k$ as a filtered video image pixel value, $X_k$ as a pixel value of an original video image, $Y_i$ as a pixel value of a reconstructed image in an N×N image block of an adjacent area, and $\sigma_{r,i}$ as a filter coefficient of each pixel (i=1, 2, . . . , N×N); and the mean squared error is used as an error calculating method.

The $Y_i$ is filtered to obtain the $Z_k$:

$$Z_k = \sum_{i=1}^{N\times N}(Y_i\sigma_{r,i}) \Big/ \sum_{i=1}^{N\times N}\sigma_{r,i}.$$

An error between the filtered image pixel value $Z_k$ and the original image pixel value $X_k$ is:

$$\text{error}_k = Z_k - X_k.$$

When the mean squared error is minimum, a corresponding filter coefficient $\sigma_{r,i}$ may be obtained, that is:

$$\sigma_{r,i} = \arg\min E[\text{error}_k^2],$$

where:

$$E[\text{error}_k^2] =$$

$$E[(Z_k - X_k)^2] = E\left[\left(\sum_{i=1}^{N\times N}Y_i\sigma_{r,i}\right)^2\right] + E[(X_k)^2] - 2E\left[\left(\sum_{i=1}^{N\times N}Y_i\sigma - r, i\right)(X_k)\right],$$

$E[\text{error}_k^2]$ is used to obtain a partial derivative:

$$\frac{\partial}{\partial \sigma_i}E[\text{error}_k^2] = 2\left(\sum_{i,j=1}^{N\times N}E\{(Y_i)(Y_j)\}\sigma_j\right) - 2E[(Y_i)(X_k)] = 0$$

$$i = 1, \ldots, N\times N.$$

The foregoing equation set is solved to obtain the $\sigma_{r,i}$, and an optimal video image filter threshold $\sigma_r$ is obtained by using a method, for example, for obtaining a median or an average value of coefficients in an optimal filter coefficient set $\{\sigma_{r,i}\}$. Specifically, if N=4, $\sigma_{r,1}$, $\sigma_{r,2}$, . . . , $\sigma_{r,16}$ are respectively 2, 2, 6, 3, 21, 12, 10, 7, 4, 8, 5, 3, 8, 14, 23, and 17, an average value $\bar{\sigma}_r = (2+2+6+3+21+12+10+7+4+8+5+3+8+14+23+17)/16 = 137/16 = 8.5625$ may be used as the $\sigma_r$, or a median $(7+8)/2=7.5$ may also be used as the $\sigma_r$. Definitely, the filter threshold herein may also be an integer value after the average value is rounded down again.

Similarly, a similar method may be used to obtain, by calculation, the depth image filtering threshold $\sigma_d$.

The optimal filter threshold $\sigma_r$ and are $\sigma_d$ written into a code stream, and transferred to a decoding end.

Figure 5:
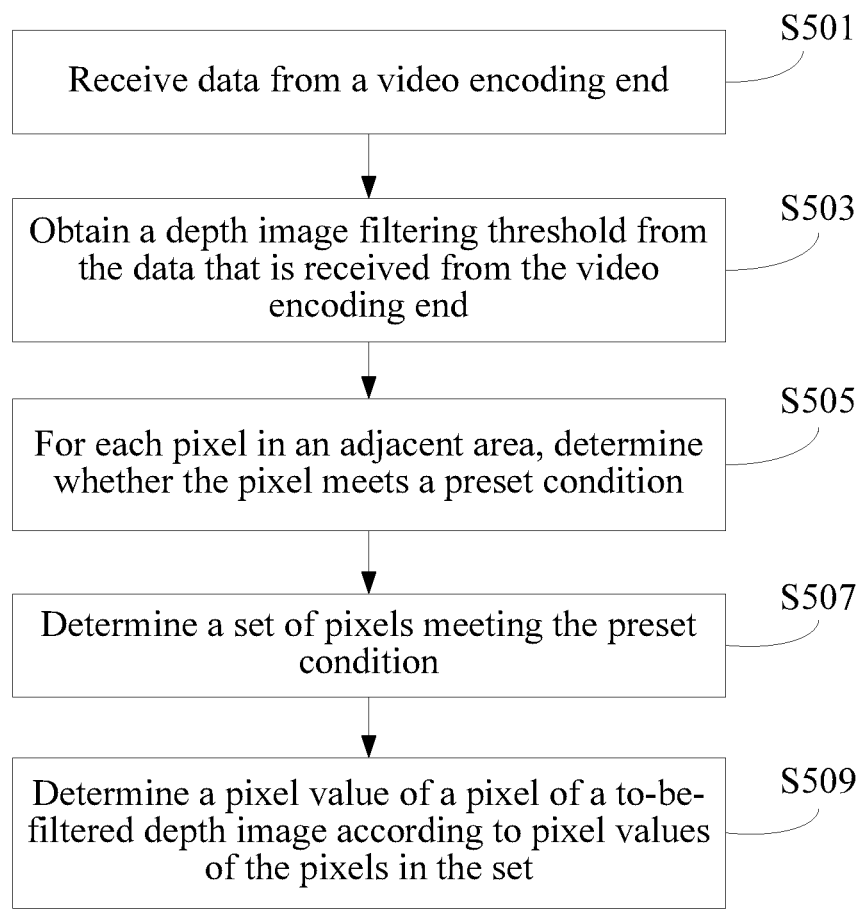
FIG. 5 is a flowchart of a depth image filtering threshold obtaining method according to Embodiment 2 of the present invention.

The embodiment of the present invention provides a flowchart of a depth image filtering threshold obtaining method, and the method is applied to the decoding end. As shown in FIG. 5, the method includes:

S501: Receive data from a video encoding end.

S503: Obtain a depth image filtering threshold from the data that is received from the video encoding end, where the depth image filtering coefficient is used for setting a preset condition, so as to determine pixels that are in an adjacent area of a pixel of a to-be-filtered depth image and meet the preset condition, and obtaining a pixel value of the pixel of the to-be-filtered depth image from the pixels that are in the adjacent area of the pixel of the to-be-filtered depth image and meet the preset condition.

The method according to the embodiment of the present invention may further include:

Step S505: For each pixel in the adjacent area, determine whether the pixel meets the preset condition.

Step S507: Determine a set of pixels meeting the preset condition.

Step S509: Determine the pixel value of the pixel of the to-be-filtered depth image according to pixel values of the pixels in the set.

Step S505 may specifically include:

Step S505': Determine a median of the pixel values of the pixels in the set, and use the median as the pixel value of the pixel of the to-be-filtered depth image.

The "median" mentioned in the embodiment of the present invention may be a value of an element arranged or an average value of elements arranged in the middle of the set, or may be an average value of elements in the set with a maximum value and a minimum value removed. The median may be calculated in multiple forms.

Optionally, the pixel of the to-be-filtered depth image may be processed by using the foregoing first filtering algorithm, second filtering algorithm or third filtering algorithm.

Optionally, before step S505, the method may further include a step of determining the adjacent area of the pixel of the to-be-filtered depth image, where the adjacent area may be in any shape, such as a row, or a column, or a rectangle, or a square.

The foregoing preset condition may include at least one of the following conditions:

a. a spatial distance between the pixel of the to-be-filtered depth image and the pixel in the adjacent area is less than or equal to a first filtering threshold;

b. a difference value between a depth image pixel value of the pixel of the to-be-filtered depth image and a depth image pixel value of the pixel in the adjacent area is less than or equal to a second filtering threshold; and c. a difference value between a video image pixel value corresponding to a location of the pixel of the to-be-filtered depth image and a video image pixel value of the pixel in the adjacent area is less than or equal to a third filtering threshold.

The foregoing preset condition may be that one condition among a, b, and c is satisfied, or both a and b are satisfied, or both a and c are satisfied, or both b and c are satisfied, or a, b, and c are all satisfied. The difference value of the pixel value may be a difference value of a component method in any image format, for example, in a YUV format, may be a difference value of each component (Y or U or V) value, or may also be a difference value of a method of an average value of any of several component values. An image format may be a format, such as YUV and RGB.

The embodiment of the present invention provides a data structure of a data packet, including a depth image filtering threshold, including at least one of a first filtering threshold, a second filtering threshold, and a third filtering threshold. The depth image filtering threshold is used for setting a preset condition, so as to determine pixels that are in an adjacent area of a pixel of a to-be-filtered depth image and meet the preset condition, and determining a pixel value of the pixel of the to-be-filtered depth image according to pixel values of the pixels in the set. The first filtering threshold, the second filtering threshold, and the third filtering threshold may be obtained in the method according to the foregoing embodiment. The data structure in this embodiment is encapsulated with the depth image filtering threshold, and transferred from an encoding end to a decoding end; the decoding end parses a data packet to obtain the depth image filtering threshold, and applies the depth image filtering threshold to set the preset condition, so as to determine the pixel that is in the adjacent area of the pixel of the to-be-filtered depth image and meets the preset condition, and determine the pixel value of the pixel of the to-be-filtered depth image according to the pixel values of the pixels in the set, which may effectively remove a ringing effect at an edge of a depth image, and reduce discontinuity of the depth image, thereby improving the quality of a video image.

Embodiment 3

Figure 6:
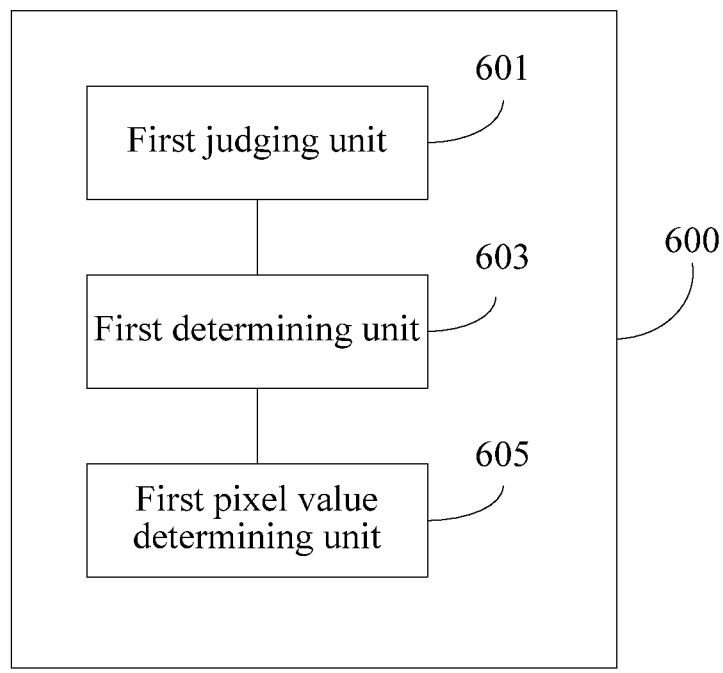
FIG. 6 is a schematic structural diagram of a depth image filtering apparatus according to Embodiment 3 of the present invention.

FIG. 6 is a schematic structural diagram of a depth image filtering apparatus 600 according to Embodiment 3 of the present invention.

As shown in FIG. 6, the depth image filtering apparatus 600 includes: a first judging unit 601 configured to: determine, for each pixel in an adjacent area of a pixel of a to-be-filtered depth image, whether the pixel meets a preset condition; a first determining unit 603 configured to determine a set of pixels meeting the preset condition; and a first pixel value determining unit 605 configured to determine a pixel value of the pixel of the to-be-filtered depth image according to pixel values of the pixels in the set.

The first pixel value determining unit 605 may be specifically configured to determine a median of the pixel values of the pixels in the set, and use the median as the pixel value of the pixel of the to-be-filtered depth image.

Figure 7:
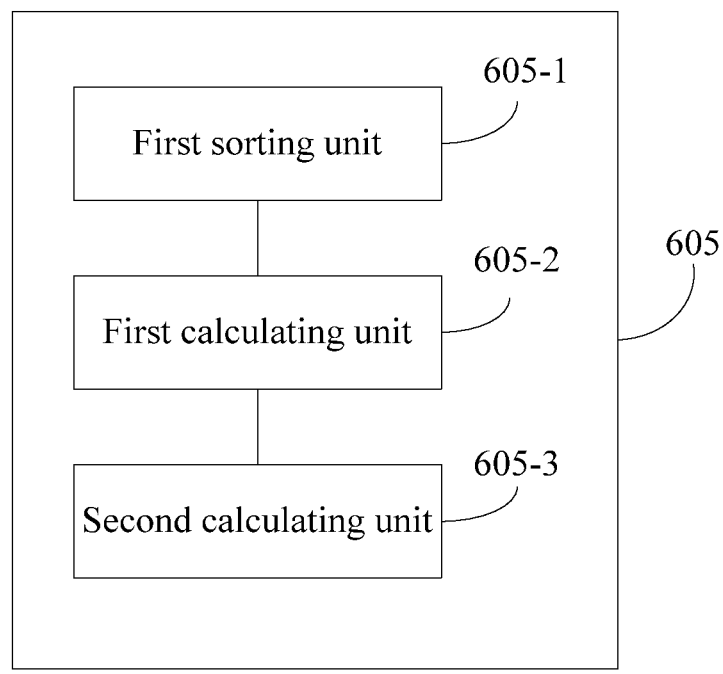
FIG. 7 is schematic structural diagram of a first pixel value determining unit according to Embodiment 3 of the present invention.

Optionally, as shown in FIG. 7, the first pixel value determining unit 605 may include: a first sorting unit 605-1 configured to sort the pixel values of the pixels in the set; a first calculating unit 605-2 configured to: when the number of pixels in the set is an odd number, use a pixel value that is located in the middle after sorting as the pixel value of the pixel of the to-be-filtered depth image; and a second calculating unit 605-3 configured to: when the number of pixels in the set is an even number, average two pixel values that are located in the middle after sorting to obtain an average value, and use the average value as the pixel value of the pixel of the to-be-filtered depth image.

Figure 8:
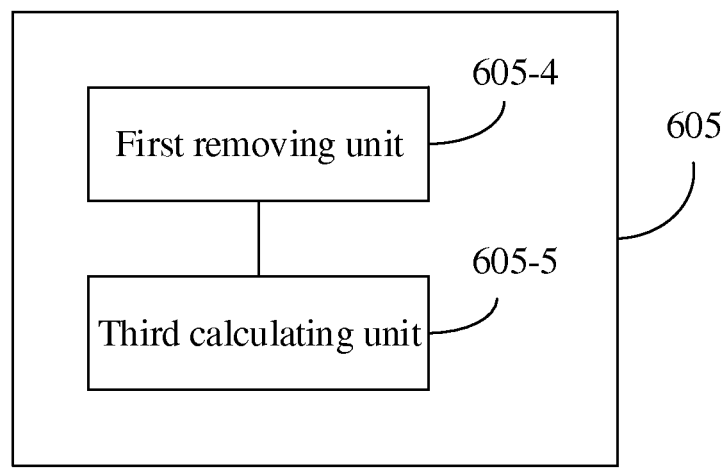
FIG. 8 is schematic structural diagram of another first pixel value determining unit according to Embodiment 3 of the present invention.

Optionally, as shown in FIG. 8, the first pixel value determining unit 605 may include: a first removing unit 605-4 configured to remove pixels with a maximum pixel value and a minimum pixel value from the set; and a third calculating unit 605-5 configured to determine an average value of pixel values of remaining pixels in the set, and use the average value as the pixel value of the pixel of the to-be-filtered depth image.

Figure 9:
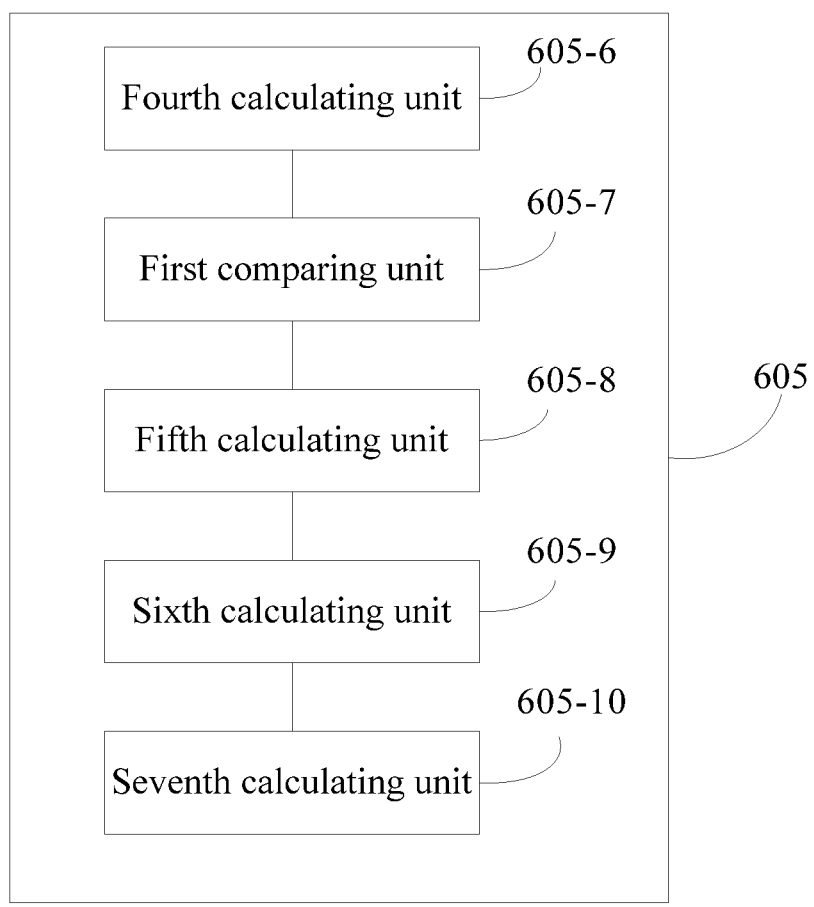
FIG. 9 is schematic structural diagram of another first pixel value determining unit according to Embodiment 3 of the present invention.

Optionally, as shown in FIG. 9, the first pixel value determining unit 605 may include: a fourth calculating unit 605-6 configured to determine the average value of the pixel values of the pixels in the set; a first comparing unit 605-7 configured to compare the average value with a reconstructed pixel value of the pixel of the to-be-filtered depth image; a fifth calculating unit 605-8 configured to: when the average value is greater than the reconstructed pixel value of the pixel of the to-be-filtered depth image, use the sum of the reconstructed pixel value of the pixel of the to-be-filtered depth image and a pixel offset value as the pixel value of the pixel of the to-be-filtered depth image; a sixth calculating unit 605-9 configured to: when the average value is less than the reconstructed pixel value of the pixel of the to-be-filtered depth image, use a difference that is generated by subtracting the pixel offset value from the reconstructed pixel value of the pixel of the to-be-filtered depth image as the pixel value of the pixel of the to-be-filtered depth image; and a seventh calculating unit 605-10 configured to: when the average value is equal to the reconstructed pixel value of the pixel of the to-be-filtered depth image, use the average value as the pixel value of the pixel of the to-be-filtered depth image.

Optionally, the depth image filtering apparatus 600 may further include: a first adjacent area determining unit configured to determine the adjacent area of the pixel of the to-be-filtered depth image.

Figure 10:
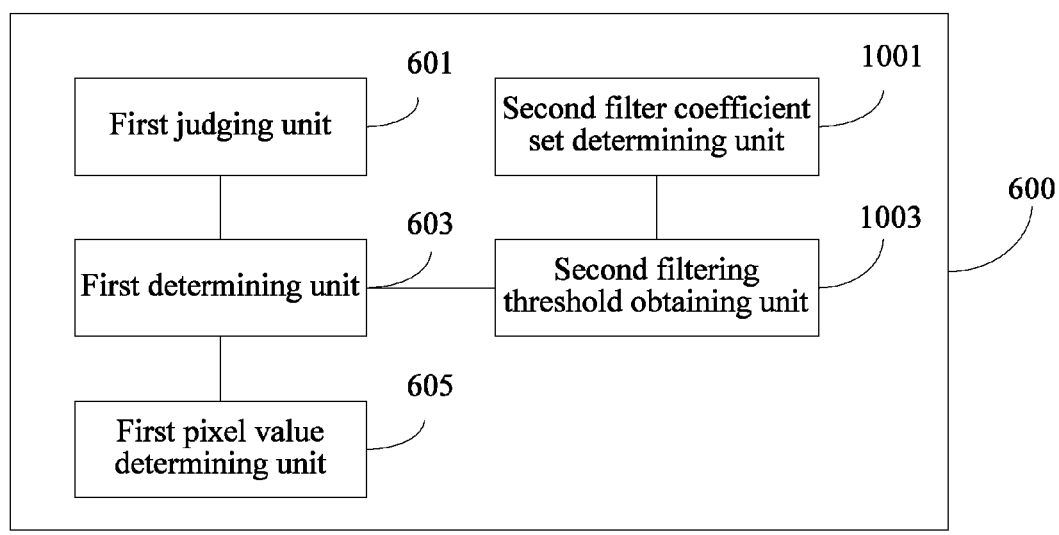
FIG. 10 is a schematic structural diagram of another depth image filtering apparatus according to Embodiment 3 of the present invention.

As shown in FIG. 10, besides the foregoing units in FIG. 6, the depth image filtering apparatus 600 may further include: a second filter threshold set determining unit 1001 configured to determine a depth image filter coefficient set which makes an error between an original depth image and a reconstructed depth image minimum; and a second filtering threshold obtaining unit 1003 configured to obtain a median or an average value of a depth image filter coefficient in the depth image filter coefficient set, and use the median or the average value as a second filtering threshold.

Figure 11:
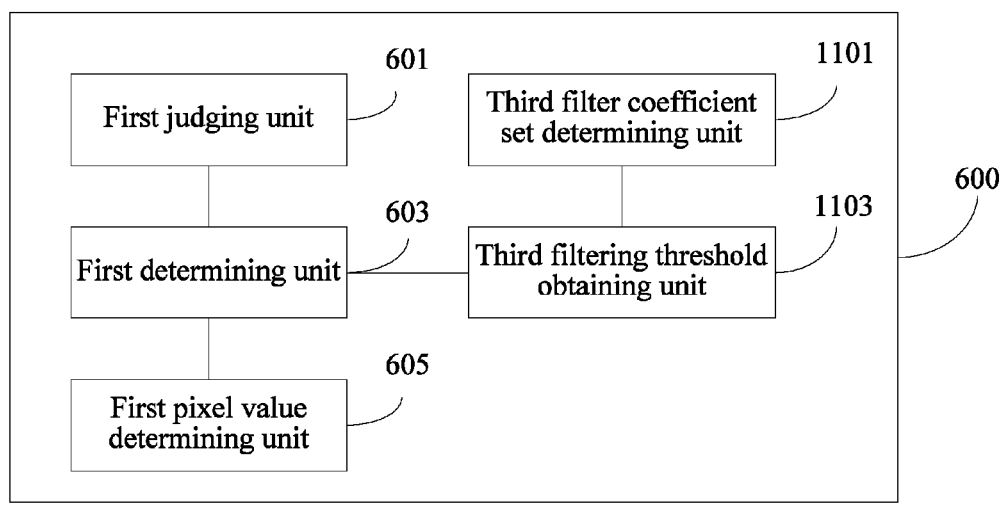
FIG. 11 is a schematic structural diagram of another depth image filtering apparatus according to Embodiment 3 of the present invention.

As shown in FIG. 11, besides the foregoing units in FIG. 6, the depth image filtering apparatus may further include: a third filter threshold set determining unit 1101 configured to determine a video image filter coefficient set which makes an error between an original video image and a reconstructed video image minimum; and a third filtering threshold obtaining unit 1103 configured to obtain a median or an average value of a video image filter coefficient in the video image filter coefficient set, and use the median or the average value as a third filtering threshold.

The foregoing preset condition may include at least one of the following conditions:

a. a spatial distance between the pixel of the to-be-filtered depth image and the pixel in the adjacent area is less than or equal to a first filtering threshold;

b. a difference value between a depth image pixel value of the pixel of the to-be-filtered depth image and a depth image pixel value of the pixel in the adjacent area is less than or equal to the second filtering threshold; and c. a difference value between a video image pixel value corresponding to a location of the pixel of the to-be-filtered depth image and a video image pixel value of the pixel in the adjacent area is less than or equal to the third filtering threshold.

The foregoing preset condition may be that one condition among a, b, and c is satisfied, or both a and b are satisfied, or both a and c are satisfied, or both b and c are satisfied, or a, b, and c are all satisfied.

The depth image filtering apparatus according to the embodiment of the present invention may be a processor (such as a CPU) or an ASIC, or the like. The depth image filtering apparatus according to the embodiment of the present invention may be deployed at a video encoding end or decoding end. Specifically, the depth image filtering apparatus may be installed on a computer, a mobile phone, a set top box, a television, other various electronic devices, or the like.

According to the embodiment of the present invention, for each pixel in an adjacent area of a pixel of a to-be-filtered depth image, whether the pixel meets a preset condition is determined; a set of pixels meeting the preset condition is determined; and a pixel value of the pixel of the to-be-filtered depth image is determined according to pixel values of the pixels in the set, which may effectively remove a ringing effect at an edge of a depth image, and reduce discontinuity of the depth image, thereby improving the quality of a video image.

Embodiment 4

Figure 12:
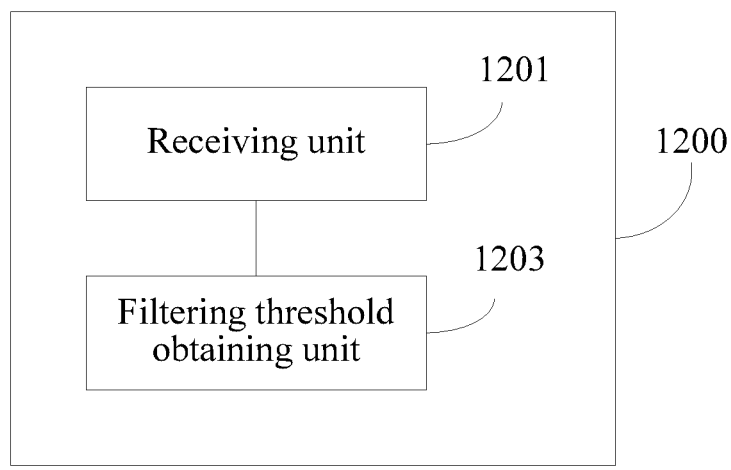
FIG. 12 is a schematic structural diagram of a video decoding end according to Embodiment 4 of the present invention.

FIG. 12 is a schematic structural diagram of a video decoding end 1200 according to Embodiment 4 of the present invention.

As shown in FIG. 12, the video decoding end 1200 according to the embodiment of the present invention includes: a receiving unit 1201 configured to receive data from a video encoding end; and a filtering threshold obtaining unit 1203 configured to parse the data received from the video encoding end to obtain a filtering threshold, where the filtering threshold is used for setting a preset condition, so as to determine pixels that are in an adjacent area of a pixel of a to-be-filtered depth image and meet the preset condition, and obtaining a pixel value of the pixel of the to-be-filtered depth image from the pixels that are in the adjacent area of the pixel of the to-be-filtered depth image and meet the preset condition.

Figure 13:
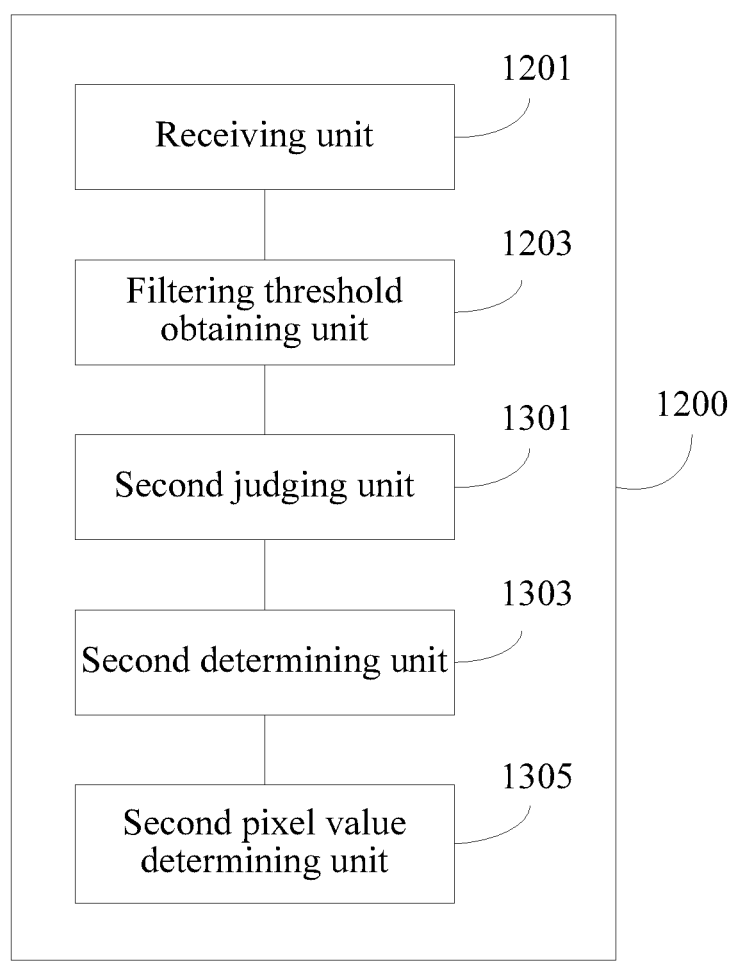
FIG. 13 is a schematic structural diagram of another video decoding end according to Embodiment 3 of the present invention.

As shown in FIG. 13, besides the foregoing units in FIG. 12, the video decoding end may further include: a second judging unit 1301 configured to: for each pixel in the adjacent area, determine whether the pixel meets the preset condition; a second determining unit 1303 configured to determine a set of pixels meeting the preset condition; and a second pixel value determining unit 1305 configured to determine the pixel value of the pixel of the to-be-filtered depth image according to pixel values of the pixels in the set.

The second pixel value determining unit 1305 may be specifically configured to determine a median of the pixel values of the pixels in the set, and use the median as the pixel value of the pixel of the to-be-filtered depth image.

Figure 14:
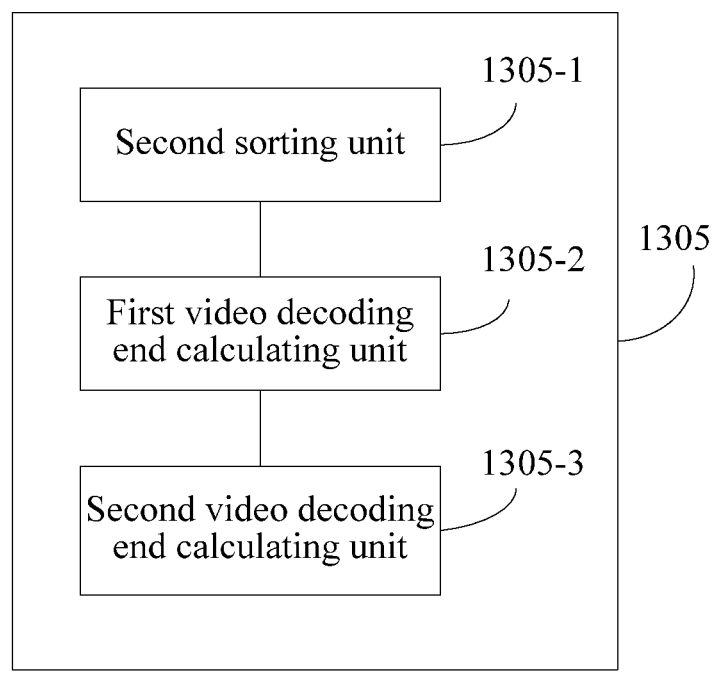
FIG. 14 is schematic structural diagram of a second pixel value determining unit according to Embodiment 3 of the present invention.

Optionally, as shown in FIG. 14, the second pixel value determining unit 1305 may include: a second sorting unit 1305-1 configured to sort the pixel values of the pixels in the set; a first video decoding end calculating unit 1305-2 configured to: when the number of pixels in the set is an odd number, use a pixel value that is located in the middle after sorting as the pixel value of the pixel of the to-be-filtered depth image; and a second video decoding end calculating unit 1305-3 configured to: when the number of pixels in the set is an even number, average two pixel values that are located in the middle after sorting to obtain an average value, and use the average value as the pixel value of the pixel of the to-be-filtered depth image.

Figure 15:
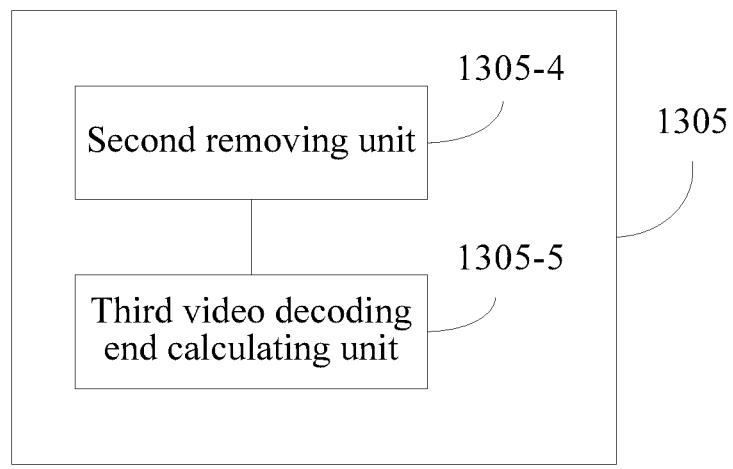
FIG. 15 is schematic structural diagram of another second pixel value determining unit according to Embodiment 3 of the present invention.

Optionally, as shown in FIG. 15, the second pixel value determining unit 1305 may include: a second removing unit 1305-4 configured to remove pixels with a maximum pixel value and a minimum pixel value from the set; and a third video decoding end calculating unit 1305-5 configured to determine an average value of pixel values of remaining pixels in the set, and use a positive integer to which the average value is closest as the pixel value of the pixel of the to-be-filtered depth image.

Figure 16:
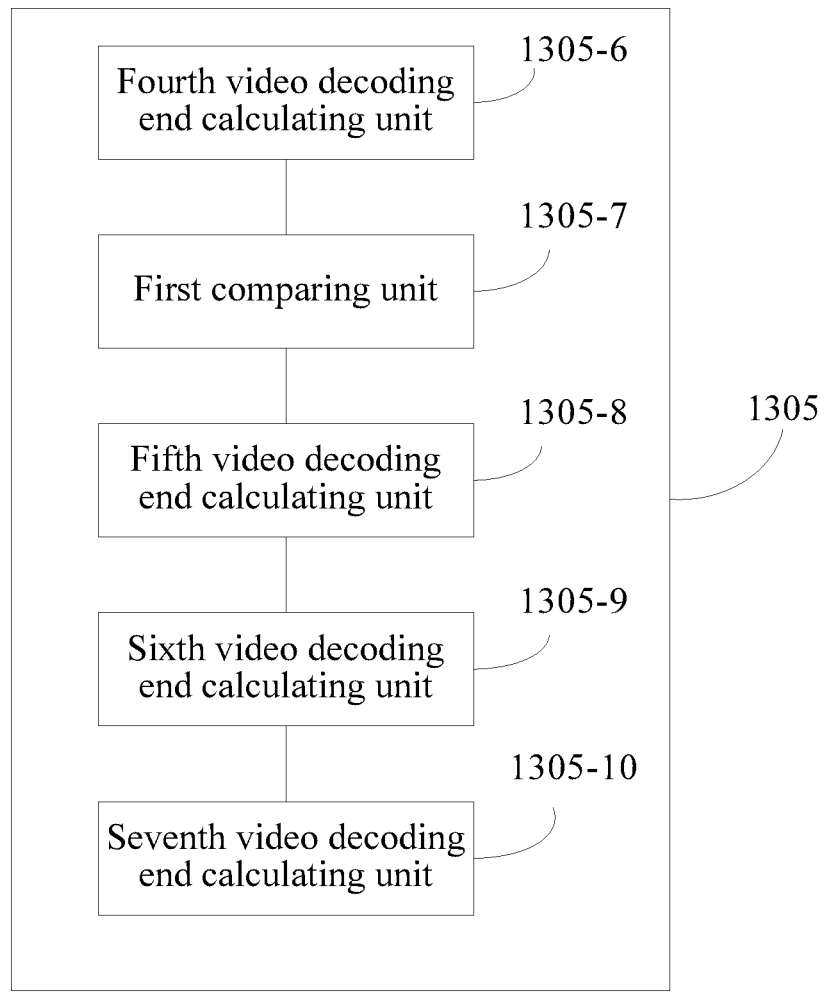
FIG. 16 is schematic structural diagram of another second pixel value determining unit according to Embodiment 3 of the present invention.

Optionally, as shown in FIG. 16, the second pixel value determining unit 1305 may include: a fourth video decoding end calculating unit 1305-6 configured to determine the average value of the pixel values of the pixels in the set; a second comparing unit 1305-7 configured to compare the average value with a reconstructed pixel value of the pixel of the to-be-filtered depth image; a fifth video decoding end calculating unit 1305-8 configured to: when the average value is greater than the reconstructed pixel value of the pixel of the to-be-filtered depth image, use the sum of the reconstructed pixel value of the pixel of the to-be-filtered depth image and a pixel offset value as the pixel value of the pixel of the to-be-filtered depth image; a sixth video decoding end calculating unit 1305-9 configured to: when the average value is less than the reconstructed pixel value of the pixel of the to-be-filtered depth image, use a difference that is generated by subtracting the pixel offset value from the reconstructed pixel value of the pixel of the to-be-filtered depth image as the pixel value of the pixel of the to-be-filtered depth image; and a seventh video decoding end calculating unit 1305-10 configured to: when the average value is equal to the reconstructed pixel value of the pixel of the to-be-filtered depth image, use the average value as the pixel value of the pixel of the to-be-filtered depth image.

Optionally, the video decoding end may further include a second adjacent area determining unit configured to determine the adjacent area of the pixel of the to-be-filtered depth image.

The foregoing preset condition may include at least one of the following conditions:

a. a spatial distance between the pixel of the to-be-filtered depth image and the pixel in the adjacent area is less than or equal to a first filtering threshold;

b. a difference value between a depth image pixel value of the pixel of the to-be-filtered depth image and a depth image pixel value of the pixel in the adjacent area is less than or equal to a second filtering threshold; and c. a difference value between a video image pixel value corresponding to a location of the pixel of the to-be-filtered depth image and a video image pixel value of the pixel in the adjacent area is less than or equal to a third filtering threshold.

The foregoing preset condition may be that one condition among a, b, and c is satisfied, or both a and b are satisfied, or both a and c are satisfied, or both b and c are satisfied, or a, b, and c are all satisfied. The difference value of the pixel value may be a difference value of a component method in any image format, for example, in a YUV format, may be a difference value of each component (Y or U or V) value, or may also be a difference value of a method of an average value of any of several component values. An image format may be a format, such as YUV and RGB.

The video decoding end according to the embodiment of the present invention may be a processor (such as a CPU) or an ASIC, or the like. The video decoding end according to the embodiment of the present invention may be specifically a computer, a mobile phone, a set top box, a television, other various electronic devices, or the like.

According to the embodiment of the present invention, for each pixel in an adjacent area of a pixel of a to-be-filtered depth image, whether the pixel meets a preset condition is determined; a set of pixels meeting the preset condition is determined; and a pixel value of the pixel of the to-be-filtered depth image is determined according to pixel values of the pixels in the set, which may effectively remove a ringing effect at an edge of a depth image, and reduce discontinuity of the depth image, thereby improving the quality of a video image.

Persons of ordinary skill in the art should understand that all or a part of the steps for implementing the method embodiments may be implemented by a program instructing relevant hardware. The program may be stored in a computer readable storage medium. When the program is run, the steps included in the method embodiments are performed. The storage medium may be any medium that is capable of storing program code, such as a read-only memory (ROM), a random-access memory (RAM), a magnetic disk, or an optical disc.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A depth image filtering threshold obtaining method, comprising:

receiving data from a video encoding end;

obtaining a depth image filtering threshold from the data;

setting a preset condition based on the depth image filtering threshold;

Selecting a subset of pixels from a set of pixels of an adjacent area of a pixel of a to-be-filtered depth image, wherein the subset of pixels meet the preset condition;

Calculating a pixel value of the pixel of the to-be-filtered depth image using pixel values of the subset of pixels; and Generating a video image using the to-be-filtered depth image.

2. The depth image filtering threshold obtaining method according to claim 1, wherein calculating the pixel value of the pixel of the to-be-filtered depth image according to the pixel values of the pixels in the subset comprises:

calculating a median of the pixel values of the pixels in the subset; and setting the median as the pixel value of the pixel of the to-be-filtered depth image.

3. The depth image filtering threshold obtaining method according to claim 2, wherein calculating the median of the pixel values of the pixels in the subset, and setting the median as the pixel value of the pixel of the to-be-filtered depth image comprises:

sorting the pixel values of the pixels in the subset;

setting a pixel value located in the middle of the sorted pixel values as the pixel value of the pixel of the to-be-filtered depth image when the number of pixels in the set is an odd number;

averaging two pixel values located in the middle of the sorted pixel values to obtain an average value;

setting the average value as the pixel value of the pixel of the to-be-filtered depth image when the number of pixels in the subset is an even number.

4. The depth image filtering threshold obtaining method according to claim 2, wherein calculating the median of the pixel values of the pixels in the subset, and setting the median as the pixel value of the pixel of the to-be-filtered depth image comprises:

removing pixels with a maximum pixel value and a minimum pixel value from the set;

calculating an average value of pixel values of remaining pixels in the set; and setting the average value as the pixel value of the pixel of the to-be-filtered depth image.

5. The depth image filtering threshold obtaining method according to claim 1, wherein the calculating the pixel value of the pixel of the to-be-filtered depth image according to the pixel values of the pixels in the subset comprises:

calculating an average value of the pixel values of the pixels in the subset;

comparing the average value with a reconstructed pixel value of the pixel of the to-be-filtered depth image;

setting the sum of the reconstructed pixel value of the pixel of the to-be-filtered depth image and a pixel offset value as the pixel value of the pixel of the to-be-filtered depth image when the average value is greater than the reconstructed pixel value of the pixel of the to-be-filtered depth image;

setting a difference that is generated by subtracting the pixel offset value from the reconstructed pixel value of the pixel of the to-be-filtered depth image as the pixel value of the pixel of the to-be-filtered depth image when the average value is less than the reconstructed pixel value of the pixel of the to-be-filtered depth image; and setting the average value as the pixel value of the pixel of the to-be-filtered depth image when the average value is equal to the reconstructed pixel value of the pixel of the to-be-filtered depth image.

6. The depth image filtering threshold obtaining method according to claim 1, further comprising determining the adjacent area of the pixel of the to-be-filtered depth image.

7. The depth image filtering threshold obtaining method according to claim 1, wherein the preset condition comprises at least one of the following conditions:
   a spatial distance between the pixel of the to-be-filtered depth image and the pixel in the adjacent area is less than or equal to a first filtering threshold;
   a difference value between a depth image pixel value of the pixel of the to-be-filtered depth image and a depth image pixel value of the pixel in the adjacent area is less than or equal to a second filtering threshold; and
   a difference value between a video image pixel value corresponding to a location of the pixel of the to-be-filtered depth image and a video image pixel value of the pixel in the adjacent area is less than or equal to a third filtering threshold.

8. The depth image filtering threshold obtaining method according to claim 1, further comprising:
   calculating, by the video encoding end, a depth image filter coefficient set which minimizes an error between an original depth image and a reconstructed depth image;
   obtaining a median or an average value of a depth image filter coefficient in the depth image filter coefficient set; and
   setting the median or the average value as a second filtering threshold.

9. The depth image filtering threshold obtaining method according to claim 1, further comprising:
   calculating, by the video encoding end, a video image filter coefficient set which minimizes an error between an original video image and a reconstructed video image;
   obtaining a median or an average value of a video image filter coefficient in the video image filter coefficient set; and
   setting the median or the average value as a third filtering threshold.

10. A video decoding end, comprising:
    a receiver configured to receive data from a video encoding end;
    a memory configured to store executable instructions; and
    a processor coupled to the memory and configured to:
       obtain a depth image filtering threshold from the data that is received from the video encoding end;
       set a preset condition based on the depth image filtering threshold:
       select a subset of pixels from a set of pixels of an adjacent area of a pixel of a to-be-filtered depth image, wherein the subset of pixels meet the preset condition:
       calculate a pixel value of the pixel of the to-be-filtered depth image using pixel values of the subset of pixels; and
       generate a video image using the to-be-filtered depth image.

11. The video decoding end according to claim 10, wherein the processor is further configured to:
    calculate a median of the pixel values of the pixels in the subset; and
    set the median as the pixel value of the pixel of the to-be-filtered depth image.

12. The video decoding end according to claim 11, wherein the processor is further configured to:
    sort the pixel values of the pixels in the subset;
    set a pixel value that is located in the middle of the sorted pixel values as the pixel value of the pixel of the to-be-filtered depth image when the number of pixels in the subset is an odd number;
    average two pixel values that are located in the middle of the sorted pixel values to obtain an average value; and
    set the average value as the pixel value of the pixel of the to-be-filtered depth image when the number of pixels in the subset is an even number.

13. The video decoding end according to claim 11, wherein the processor is further configured to:
    remove pixels with a maximum pixel value and a minimum pixel value from the subset; and
    calculate an average value of pixel values of remaining pixels in the subset, and set a positive integer to which the average value is closest as the pixel value of the pixel of the to-be-filtered depth image.

14. The depth image filtering apparatus according to claim 9, wherein the processor is further configured to:
    calculate an average value of the pixel values of the pixels in the subset;
    compare the average value with a reconstructed pixel value of the pixel of the to-be-filtered depth image;
    set the sum of the reconstructed pixel value of the pixel of the to-be-filtered depth image and a pixel offset value as the pixel value of the pixel of the to-be-filtered depth image when the average value is greater than the reconstructed pixel value of the pixel of the to-be-filtered depth image;
    set a difference that is generated by subtracting the pixel offset value from the reconstructed pixel value of the pixel of the to-be-filtered depth image as the pixel value of the pixel of the to-be-filtered depth image when the average value is less than the reconstructed pixel value of the pixel of the to-be-filtered depth image; and
    set the average value as the pixel value of the pixel of the to-be-filtered depth image when the average value is equal to the reconstructed pixel value of the pixel of the to-be-filtered depth image.

15. The video decoding end according to claim 10, wherein the processor is further configured to determine the adjacent area of the pixel of the to-be-filtered depth image.

16. The video decoding end according to claim 10, wherein the preset condition comprises at least one of the following conditions:
    a spatial distance between the pixel of the to-be-filtered depth image and the pixel in the adjacent area is less than or equal to a first filtering threshold;
    a difference value between a depth image pixel value of the pixel of the to-be-filtered depth image and a depth image pixel value of the pixel in the adjacent area is less than or equal to a second filtering threshold; and
    a difference value between a video image pixel value corresponding to a location of the pixel of the to-be-filtered depth image and a video image pixel value of the pixel in the adjacent area is less than or equal to a third filtering threshold.

* * * * *